W. S. LOVELL.
GEARING.
APPLICATION FILED APR. 22, 1919.

1,352,293.

Patented Sept. 7, 1920.
2 SHEETS—SHEET 1.

Inventor
Wesley S. Lovell,
By Foster, Freeman, Watson & Coix,
Attorneys

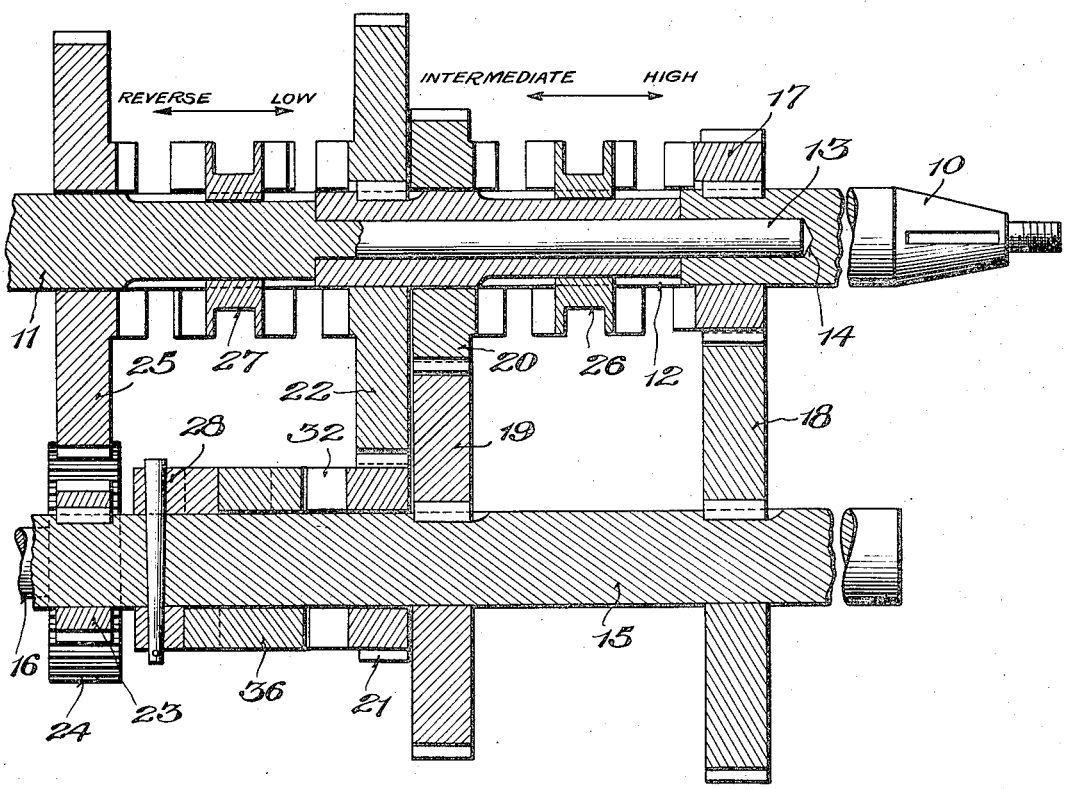
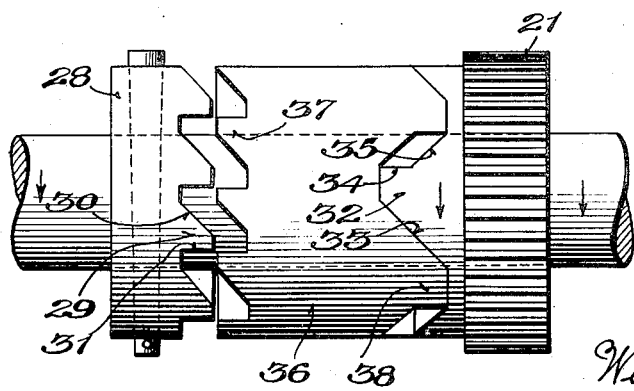

UNITED STATES PATENT OFFICE.

WESLEY S. LOVELL, OF ELMIRA, NEW YORK, ASSIGNOR OF ONE-HALF TO ROBERT R. ROCKWELL, OF ELMIRA, NEW YORK.

GEARING.

1,352,293.  Specification of Letters Patent.  Patented Sept. 7, 1920.

Application filed April 22, 1919. Serial No. 291,879.

*To all whom it may concern:*

Be it known that I, WESLEY S. LOVELL, a citizen of the United States, and residing at Elmira, Chemung county, State of New York, have invented certain new and useful Improvements in Gearing, of which the following is a specification.

This invention relates to gearing, particularly to variable speed gearing of the selective type which is commonly used between the crank shaft and the driven shaft of automobiles and other motor vehicles.

The object of the invention is to provide gearing of this character in which a plurality of combinations of the various gears and clutches employed will give a plurality of speeds of the driven shaft relatively to the drive shaft in a forward direction, and also a reverse speed and in which an automatic clutch is connected which connects the driving and driven shafts automatically through the low speed transmission whenever the clutch connecting the shafts through a higher speed transmission becomes disconnected.

Numerous awkward situations have arisen often in the past when persons driving motor vehicles have been obliged to change gears on a steep hill or crossing railroad tracks or in other dangerous places. It is often the case with the type of selective variable speed gearing now employed in motor vehicles, that the gears spin so rapidly when the engine is running fast that it is practically impossible to make an instantaneous change, the consequence being that when it is desired to change speeds it is impossible to immediately engage the clutch teeth controlling a second speed after withdrawing from engagement the clutch teeth controlling another speed. Thus it is difficult in many instances to change from high speed to intermediate or low speeds and when the vehicle is in a dangerous position this is of supreme importance.

My invention comprises a simple mechanism in which the low speed connection through the gearing is automatically made as soon as the intermediate or high speed connection is broken thereby insuring that there will be at least a low speed connection at all times and that the vehicle will never be caught in a dangerous position without a connection between the drive wheels and the engine.

The invention will be fully disclosed in the following description when taken in connection with the accompanying drawings, in which—

Fig. 3 is a section through the centers of the principal shafts shown in Fig. 1, the gears and clutches also being shown in section;

Fig. 4 is a detail view of the automatic low speed clutch.

Figure 1:
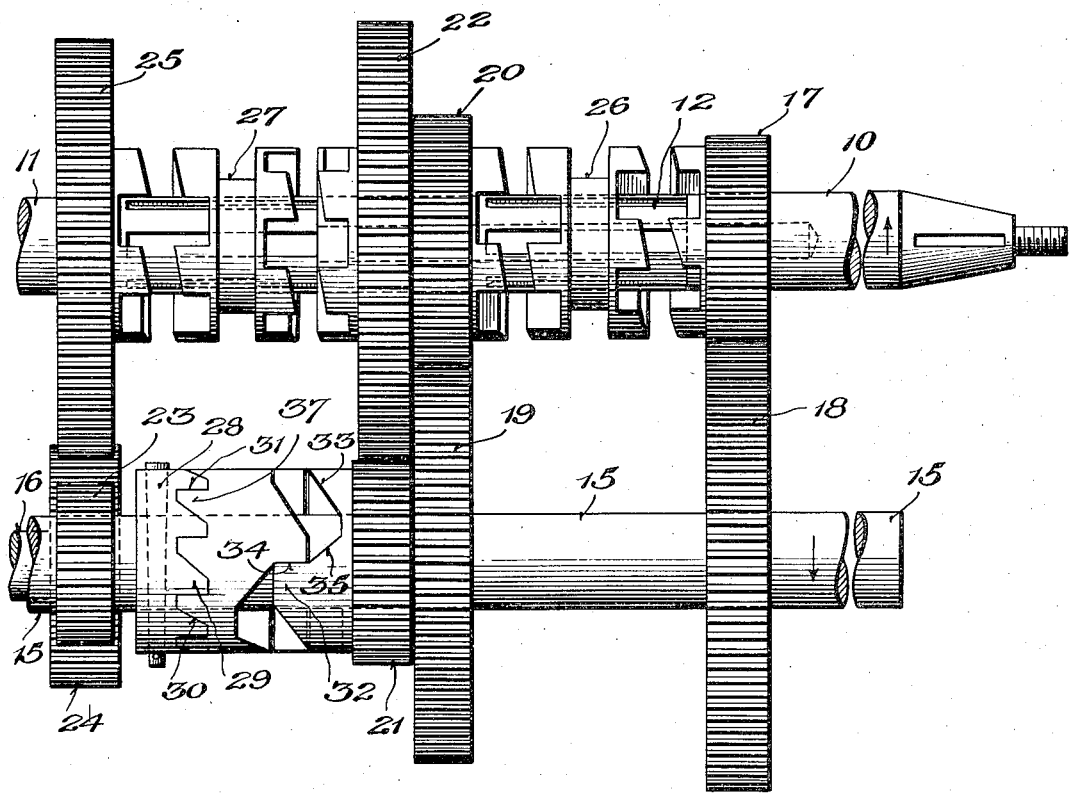
Figure 1 is a plan view of the gearing showing my invention incorporated therewith.
Figure 2:
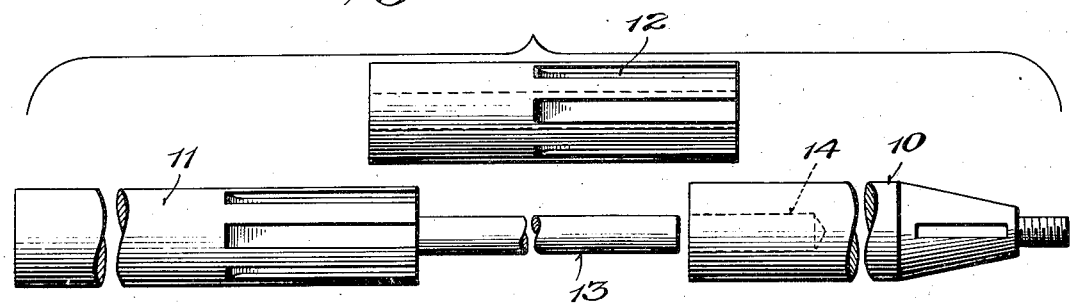
Fig. 2 is a plan view of portions of the shafting.

In the drawings the driving shaft is indicated at 10, the driven shaft at 11, and a sleeve at 12 which is mounted between shafts 10 and 11 and upon a spindle 13 extending axially from the driven shaft 11 and fitting closely within an axial bore or recess 14 in the end of the driving shaft. A counter shaft 15 is located to one side and parallel to the axis of the driving and driven shafts and a small idler shaft 16 is located close to the counter shaft 15. Fixed to the end of the driving shaft 10 is a small driving gear 17, the teeth of which intermesh with the teeth of a relatively large gear 18 firmly fixed to the counter shaft 15. By means of these gears the counter shaft 15 will be rotated as long as the engine is operated to drive the driving shaft.

Firmly secured to the counter shaft 15 near its middle point is a second gear 19 thereon which meshes with a smaller gear 20 rotatably mounted upon the sleeve 12. Another gear connection between the counter shaft and the sleeve 12 is through the relatively small gear 21 rotatably mounted on the counter shaft and the relatively large gear 22 securely fastened on the sleeve. The driven shaft may also be connected to the counter shaft through the reverse gear which comprises a gear 23 of relatively small diameter secured on the shaft 15, a gear 24 rotatably mounted on idler shaft 16 and a gear 25 rotatably mounted upon the driven shaft, the teeth of the gear 24 meshing with the teeth of gears 23 and 25 and the whole comprising a system whereby motion of the driving shaft is communicated to the driven shaft in a direction opposite to that in which the driving shaft is rotated. The gears 17 and 20, 22 and 25 have each formed on one face thereof, clutch teeth of the usual character, and sliding clutch members 26 and 27 are splined to the sleeve 12 and the driven shaft 11 respectively. The sliding clutch member 26 is provided on its opposite faces with clutch teeth suitable for engaging the clutch teeth of gears 17 and 20 respectively, and by bringing it into engagement with either of these gears, the sleeve 12 to which it is splined may be connected for rotation to either gear 17 or 20 as desired.

The clutch member 27 is similar to the clutch member 26, being provided on its opposite faces with suitable clutch teeth adapted to engage clutch teeth formed on one face of each of gears 22 and 25. As the member 27 is splined to the driven shaft 11, the latter may be connected for rotation to either gear 22 or 25 depending upon which way the clutch member 27 is moved.

Keyed to the counter shaft between gears 21 and 23 is one member 28 of the automatic low speed clutch. This member has clutch teeth 29 directed toward the gear 21 and each of these teeth 29 has an inclined surface 30 and a straight surface 31 parallel with the axis of the counter shaft. The gear 21 has formed on the face directed toward the member 28 a series of teeth 32 having inclined surfaces 33 substatially parallel to the inclined surfaces of teeth 29, the opposite face of each tooth having a straight portion 34 parallel to the axis of the counter shaft and an inclined portion 35. Mounted between gear 21 and the member is a sleeve member 36 having a slight frictional bearing against the counter shaft but rotatable relatively thereto. This member is slidable longitudinally of the counter shaft and is provided with clutch teeth 37 similarly but reversely formed to the teeth 29 of the fixed member 28 and on its opposite end, which is adjacent the gear 21, with teeth 38 similarly but reversely formed to the teeth 32 on the end of gear 21. The member 36 comprises an automatic low speed clutch member for connecting the gear 21 and the member 28 or disconnecting the same without the necessity of longitudinally moving either of the members. The exact operation of this novel automatic clutch will be apparent when the operation of the gearing as an entire unity is explained.

As above mentioned the fixed driving gear 17 coöperating with the fixed gear 18 on the counter shaft, causes the counter shaft to be rotated whenever the driving shaft itself is rotated. When the clutch members 26 and 27 are as shown in Figs. 1 and 3 of the drawings, there is no connection between the driving member 10 and the driven shaft 11. To obtain low speed the clutch member 27 is slid to the right, Figs. 1 and 3, until its teeth engage with the teeth on gear 22. The connection through the gearing is then as follows: from the driving shaft 10 through gears 17, 18, counter shaft 15, clutch member 28, clutch member 36, gears 21 and 22, clutch member 27 and shaft 11. When it is desired to obtain intermediate speed the clutch member 26 is moved to the left, Figs. 1 and 3, until its teeth engage with the coöperating teeth of the gear 20, the clutch member 27 being left in its former position in engagement with gear 22. The power transmission through the gearing then takes the following path: from driving shaft 10 through gears 17, 18, counter shaft 15, gears 19, 20, clutch member 26, sleeve 12, gear 22, clutch member 27 and driven member 11.

As soon as the connection is made through the intermediate gearing as just described, it is obvious that instead of the gear 21 rotating the gear 22, that the gear 22 will rotate the gear 21 faster than shaft 15 is revolving. This is because of the gear ratio between gears 19, 20 and 22 and 21, the gear 19 being considerably larger than the gear 20 and causing the sleeve 12 and the gear 22 to rotate considerably faster than the shaft 15, and since the gear 21 is smaller than the gear 22 it will be rotated at a higher speed than the shaft 12 and consequently at a much higher speed than that of shaft 15.

The result of the increased speed of the gear 21 is that the inclined face 33 on each tooth of gear 21 catches up to and abuts against the correspondingly inclined face on a tooth 38 of member 36 and exerts a pressure thereon. As a result of this pressure the member 36 is rotated faster than the member 28 and the inclined faces 30 bearing on the correspondingly inclined faces of teeth 37 serve as cam surfaces whereby the teeth 37 are cammed out of engagement with the teeth 29 and the entire member 36 moved to the right so that the clutch is totally disengaged.

If, while in intermediate speed with the automatic clutch disengaged it was attempted, for instance, to change to high speed by shifting the clutch member 26 to the right, Figs. 1 and 3, and if for any reason whatsoever it was impossible to suitably engage the corresponding teeth of clutch 26 and gear 17 to make the high speed connection, the automatic low speed clutch would instantly operate to connect the transmission through the low speed gear in the following manner. Immediately upon the disengagement of clutch 26 and gear 20 there is no connection between the driving shaft and the sleeve 12, and the large gear 22, therefore, instantly begins to drag back on the gear 21. The result of the retardation of gear 21 is that the forward corners of teeth 38 will ride up the inclined surfaces of teeth 33, which surfaces act as cam surfaces for this purpose, and the member 36 has such a degree of frictional engagement with the counter shaft 15 that the member 36 will not rotate freely with the member 21 thereby preventing this camming action. As soon as the member 36 is moved a slight distance toward the left, the teeth 29 and 37 will again catch, making the connection from the constantly rotating counter shaft to the driven shaft through the members 28, 36, gears 21 and 22, clutch member 27 and shaft 11 as in the first instance. The high speed connection is obtained by moving the clutch member 26 to the right to engage the driving gear 17, it being understood, of course, that clutch member 27 is in engagement with the clutch teeth on gear 22. The connection between the driving shaft 10 and driven shaft 11 is then through gear 17, clutch member 26, sleeve 12, gear 22, clutch member 27 and driven shaft 11, it being, of course, understood that the automatic clutch has become disconnected as explained before in the case where the clutch member 26 was moved to the left and the intermediate transmission obtained.

The reverse speed is obtained in the usual manner through reversing gear 24, the clutch member 27 being moved to the left, Figs. 1 and 3 to engage the clutch teeth on gear 25 and the power transmission being then from driving shaft 10 through gears 17, 18, counter shaft 15, gears 23, 24 and 25, clutch member 27, and driven shaft 11. The automatic low speed clutch member, of course, does not work when the reverse gear is thrown in. From the above description it will be seen that I have disclosed a novel automatic mechanism whereby when for any cause it is necessary to change gears from intermediate to high speed or vice versa, and the operator fails to make the connection, the transmission will be immediately and automatically connected through the low gear mechanism. This is a safety device of great practical importance and it will be found to totally obviate the dangers of changing gears on hills and at other dangerous places which has proven so awkward in the past. The invention is simple and is inexpensive to construct, will not become out of order and is in every way a practical and valuable addition to gearing for motor vehicles, although, of course, I do not limit myself to its use in such connection as it might also be used in connection with stationary engines, launches, &c.

Having thus described my invention what I claim as new and desire to secure by Letters Patent is:

1. In selective, variable speed gearing, the combination with a driving shaft and a driven shaft, of means for connecting said shafts to drive the driven shaft at any one of a plurality of different speeds relatively to the speed of the driving shaft, said means including a low speed clutch which transmits power at lowest speed only, said clutch being disengaged when the shafts are connected for higher speeds and being adapted to automatically connect the shafts for low speed transmission when the higher speed connections are disconnected.

2. In selective, variable speed gearing, the combination with a driving shaft, a driven shaft in alinement therewith, one of said shafts having a spindle the outer end of which is seated in a bore in the other shaft, and a sleeve mounted on said spindle between said shafts, of means for connecting said shafts through said sleeve to drive the driven shaft at a given speed, and means for automatically connecting said shafts to drive the driven shaft at a lower speed when said first named means is disconnected.

3. In selective, variable speed gearing, the combination with a driving shaft and a driven shaft, of means comprising a series of gears and clutches for connecting said shafts to drive the driven shaft at any one of a plurality of different speeds relatively to the speed of the driving shaft, said means including a clutch member which transmits power at lowest speed only, said clutch being disengaged when the shafts are connected for higher speed transmission and being adapted to automatically connect the shafts for low speed transmission when the higher speed connections are disconnected.

4. In selective, variable speed gearing, the combination with a driving shaft, a driven shaft, and a counter shaft, of a clutch member on said driven shaft controlling low speed transmission and which is in engaging position for higher speed transmission, a second clutch member adapted to be in engaging position only for higher speed transmission, gearing controlled by said clutches, and an automatic low speed clutch on said counter shaft for connecting the driving and driven shafts through the low speed transmission gears, when the said second clutch member is disengaged.

5. In selective, variable speed gearing, the combination with a driving shaft, a driven shaft, one of said shafts having a spindle the other end of which is seated in a bore in the other shaft, a sleeve rotatably mounted on said extension, between said shafts, and a counter shaft to one side of and parallel to the alined driving and driven shafts, gears and clutches mounted on said shafts and sleeve whereby the driven shaft may be rotated at one of a plurality of different speeds by said driving shaft, including an automatic low speed clutch on the counter shaft which operates to automatically connect the driving and driven shafts through the low speed gearing when the connection through the higher speed gearing is disconnected.

6. A selective variable speed gearing including in combination, a driving shaft, a driven shaft, a counter-shaft, gearing rotatively connecting said driving and countershafts, a gear rotatively mounted on the countershaft, a second gear mounted for rotation relative to the driven shaft, a manually operable clutch to connect said second gear and driven shaft, an automatic clutch for connecting said first gear to the countershaft when the manually operable clutch is in, and means to rotatively connect the driving shaft to the driven shaft to drive the latter at another speed, said automatic clutch constructed and arranged to render the first drive inoperative when the second drive is operative.

7. A selective variable speed gearing, including in combination, a driving shaft, a driven shaft, a countershaft, gearing rotatively connecting said driving and countershafts, gearing rotatively connecting said countershaft and driven shaft including an automatic clutch and a manually operable clutch, and means to rotatively drive the driven shaft from the driving shaft at another speed, said automatic clutch constructed and arranged to render the first drive inoperative when the second drive is in, and to render the first drive again operative when the second drive is thrown out.

In testimony whereof I affix my signature.

WESLEY S. LOVELL.